(12) United States Patent
Pires et al.

(10) Patent No.: US 11,921,303 B2
(45) Date of Patent: Mar. 5, 2024

(54) AZIMUTHALLY MODULATED SCATTERING DEVICE

(71) Applicant: ROLIC TECHNOLOGIES AG, Allschwil (CH)

(72) Inventors: David Pires, Giebenach (CH); Mohammed Ibn-Elhaj, Allschwil (CH)

(73) Assignee: ROLIC TECHNOLOGIES AG, Allschwil (CH)

( * ) Notice: Subject to any disclaimer, the term of this patent is extended or adjusted under 35 U.S.C. 154(b) by 504 days.

(21) Appl. No.: 17/182,622

(22) Filed: Feb. 23, 2021

(65) Prior Publication Data

US 2021/0173130 A1 Jun. 10, 2021

Related U.S. Application Data

(62) Division of application No. 15/750,228, filed as application No. PCT/EP2016/067980 on Jul. 28, 2016, now abandoned.

(30) Foreign Application Priority Data

Aug. 7, 2015 (EP) .................................. 15180316

(51) Int. Cl.
*G02B 5/02* (2006.01)
*B42D 25/23* (2014.01)
(Continued)

(52) U.S. Cl.
CPC ........... *G02B 5/0257* (2013.01); *B42D 25/23* (2014.10); *B42D 25/29* (2014.10); *B42D 25/328* (2014.10); *B42D 25/355* (2014.10); *B42D 25/364* (2014.10); *G02B 5/0252* (2013.01); *G03H 1/0011* (2013.01); *G03H 1/0244* (2013.01); *G06K 19/06009* (2013.01);
(Continued)

(58) Field of Classification Search
CPC ... G02B 5/0257; G02B 5/0252; G03H 1/0011
See application file for complete search history.

(56) References Cited

U.S. PATENT DOCUMENTS 4,544,266 A 10/1985 Antes
5,101,184 A 3/1992 Antes
(Continued)

FOREIGN PATENT DOCUMENTS

EP 1 855 127 A1 11/2007
WO 01/29148 A1 4/2001
(Continued)

OTHER PUBLICATIONS

International Search Report for PCT/EP2016/067980, dated Nov. 2, 2016.
(Continued)

*Primary Examiner* — Nathan T Leong
(74) *Attorney, Agent, or Firm* — Sughrue Mion, PLLC

(57) ABSTRACT

Optical elements with anisotropic, patterned surface relief microstructures in which information is encoded in the distribution of the orientation of different zones. From the analysis of the distribution of the light scattered from the element, the orientation distribution in the element and therefore the encoded information can be evaluated. The elements are particularly useful for securing documents and articles against counterfeiting and falsification.

7 Claims, 7 Drawing Sheets

(51) Int. Cl.

| | | |
|---|---|---|
| *B42D 25/29* | (2014.01) | |
| *B42D 25/328* | (2014.01) | |
| *B42D 25/355* | (2014.01) | |
| *B42D 25/364* | (2014.01) | |
| *G03H 1/00* | (2006.01) | |
| *G03H 1/02* | (2006.01) | |
| *G06K 19/06* | (2006.01) | |
| *G06K 19/16* | (2006.01) | |
| *G07D 7/00* | (2016.01) | |

(52) U.S. Cl.
CPC ....... *G06K 19/06037* (2013.01); *G06K 19/16* (2013.01); *G07D 7/0032* (2017.05)

(56) References Cited

U.S. PATENT DOCUMENTS

| | | | |
|---|---|---|---|
| 5,856,048 | A  | 1/1999 | Tahara et al. |
| 6,425,606 | B1 | 7/2002 | Lu et al. |
| 7,679,826 | B2 | 3/2010 | Ezra |
| 7,710,652 | B2 | 5/2010 | Dichtl |
| 8,111,352 | B2 | 2/2012 | Stalder et al. |
| 8,514,354 | B2 | 8/2013 | Amimori et al. |
| 8,770,487 | B2 | 7/2014 | Toda et al. |
| 2004/0016810 | A1 | 1/2004 | Hori et al. |
| 2004/0031849 | A1 | 2/2004 | Hori et al. |
| 2010/0119738 | A1 | 5/2010 | Suzuki et al. |
| 2012/0027998 | A1 | 2/2012 | Ibn-Elhaj et al. |
| 2012/0319395 | A1 | 12/2012 | Fuhse et al. |
| 2013/0285361 | A1 | 10/2013 | Staub et al. |
| 2014/0185000 | A1 | 7/2014 | Takahashi et al. |
| 2014/0240582 | A1 | 8/2014 | Hasegawa |
| 2015/0151562 | A1 | 6/2015 | Whiteman et al. |

FOREIGN PATENT DOCUMENTS

| | | |
|---|---|---|
| WO | 2007/131375 A1 | 11/2007 |
| WO | 2010/094441 A1 | 8/2010 |

OTHER PUBLICATIONS

Written Opinion for PCT/EP2016/067980, dated Nov. 2, 2016.
Liu et al., "Polarization-controlled anisotropic coding metamaterials at terahertz frequencies," arXiv e-prints, Sep. 2015, https://ui.adsabs.harvard.edu/abs/2015arXiv150903692L. (Year: 2015).

Fig. 1.1
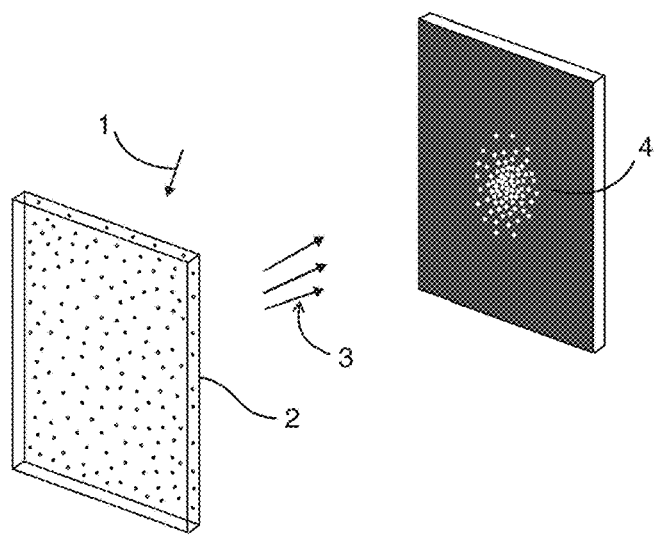
Fig. 1.2
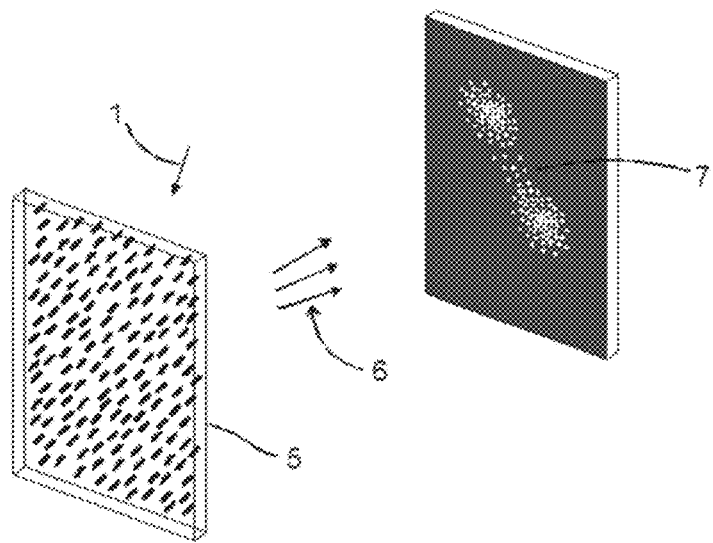
Fig. 2
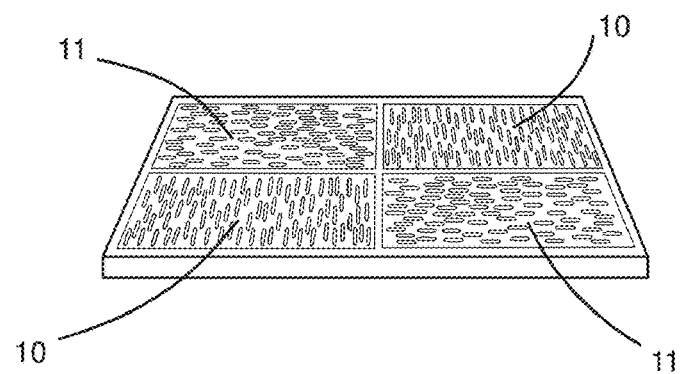

AZIMUTHALLY MODULATED SCATTERING DEVICE

CROSS REFERENCE TO RELATED APPLICATIONS

This application is a Divisional application of U.S. application Ser. No. 15/750,228, filed Feb. 5, 2018, which is a National Stage of Application No. PCT/EP2016/067980 filed Jul. 28, 2016, claiming priority based on European Patent Application No. 15180316.0 filed Aug. 7, 2015, the contents of each of which are incorporated by reference herein in their entirety.

TECHNICAL FIELD

The invention relates to optical elements with anisotropic, patterned surface relief microstructures in which information is encoded in the distribution of the orientation of different zones. The elements according to the invention are particularly useful for securing documents and articles against counterfeiting and falsification.

BACKGROUND OF THE INVENTION

There is a constant need for novel distinctive features in optical security elements for forgery protection. Depending on the tools required for verification, security devices are categorized in three security levels. First level devices have overt features, which can be verified by people, for example by optical recognition. There is a strong need for first level features, in particular for banknotes, credit cards or other value documents, as they can be fast and easily verified without any additional tool. Second level features are semi-covert features such as microprints or uv-activated features which need additional tools for verification, for example through visualization. Third level security devices have covert features, which need detection systems for checking the authenticity. Optical elements comprising a combination of different levels of security offer an increased protection against forgery.

Optically variable devices (OVD), such as holograms and kinegrams, are well known first level optical security features. In addition, there are first level optical elements, which are based on anisotropic optical scattering.

WO2007/131375 discloses optical elements using anisotropic scattering to display high resolution optical information, for example in the form of images, photographs, graphics or lettering, with a pronounced positive-negative switch upon tilting or rotating the element, thereby producing an obvious contrast reversal of an image. The optical information may appear as black and white or colored. Because of the non-periodic, anisotropic surface relief structure, which causes the interaction with the incident light, the images appear without the typical rainbow colors known from holograms or kinegrams. Therefore, the optical feature and the instruction how to verify it can easily be described to a layman.

U.S. Pat. No. 7,710,652B2 discloses anisotropic scattering structures comprising a plurality of grating lines, which, for example, can be created by electron beam lithography. The grating lines have a random variation of the spacing, curvature, orientation or profile.

There is still a constant need for novel distinctive features in optical security elements for forgery protection.

SUMMARY OF THE INVENTION

An object of the present invention is, therefore, to provide an optical element with novel security features as well as corresponding verification methods. A further object is to provide methods for manufacturing such optical elements.

According to a first aspect of the invention an optical element is provided comprising a region with a patterned anisotropic surface relief microstructure, which has zones with different anisotropy directions $\theta_i$, wherein information is encoded in the distribution of zones with the different anisotropy directions.

The distribution of zones with the different anisotropy directions can be characterized by $f_i(\theta_i)$, which is the fraction of the areas of zones with the anisotropy direction along $\theta_i$ with regard to the total area with anisotropic surface relief microstructure in that region.

The region comprising the different zones with the patterned anisotropic surface relief microstructure may also comprise areas without anisotropic surface relief microstructure. For the calculation of the fractions $f_i(\theta_i)$ those areas are not taken into account.

When observed by naked eye, the region comprising the pattern may appear uniform and an observer will not be able to determine the information without additional evaluation tools.

The optical effect of the elements according to the invention is based on anisotropic light scattering. FIGS. 1.1 and 1.2 illustrate the difference between isotropic and anisotropic light scattering.

Scattering at an isotropic scattering surface is such that no azimuthal direction is preferred. As indicated in FIG. 1.1, collimated incoming light 1 is redirected at the scattering surface 2 into new outgoing directions 3 with a characteristic axial-symmetric output light distribution and a characteristic divergence angle 4.

In case of an anisotropic scattering surface the light is scattered into preferred azimuthal directions. In FIG. 1.2, collimated incoming light 1 impinges on an anisotropically scattering surface 5 and is redirected into new outgoing directions 6 with a characteristic output light distribution 7.

In the context of the present invention, the term anisotropy direction shall mean a local symmetry axis within the plane of a layer, for example the direction along grooves or valleys of a microstructure.

If a surface comprises a pattern of anisotropic structures with locally differing anisotropy directions, like the directions 10, 11 in FIG. 2, then the individual zones of the pattern scatter incoming light into different directions.

A region in which information is encoded in the distribution of zones with different anisotropy directions may have any form.

The pattern encoding information by the orientation distribution can be the background of an OVD scattering element or may be the fill pattern of characters, numbers, logos or any other image.

The information encoded in the distribution of zones with the different anisotropy directions may be the only information present in an optical element. However, the pattern encoding the information by the orientation distribution may be combined with other security features. For example, the regions comprising the pattern which encodes information by the orientation distribution may be an area inside or outside a structure of another security feature, for example of an OVD feature, such as a hologram, a kinegram or a scattering device displaying any other information. It could be applied as a background of an OVD scattering element or may be the filling pattern of characters, numbers, logos or any other image.

As an example of a preferred embodiment of the invention, FIG. 3 shows an element 20, which displays a star 22 on a background 21. The background comprises an anisotropic surface relief microstructure pattern according to the invention, which encodes information by the distribution of zones with the different anisotropy directions. Macroscopically, the background looks uniform and it is possible to evaluate the encoded information at any point of the background. The star is visible because of a different optical effect. Any optical effect that makes the star visible could be used. In the simplest form the star is printed, but it could also comprise a diffractive or scattering structure. For example, the star may comprise an anisotropic surface relief microstructure, which may be uniform. In a preferred embodiment of the invention, both the background as well as the area inside a displayed information comprises an anisotropic surface relief microstructure pattern according to the invention, which both encode information by the distribution of zones with the different anisotropy directions.

An element according to the invention is preferably applied as security feature in banknotes or other value documents. For example it may be applied as a stripe or a patch.

According to a second aspect of the invention a method is provided for evaluating the information encoded in the orientation distribution. The method comprises detection of the spatial light distribution scattered from an element comprising a region with a patterned anisotropic surface relief microstructure, which has zones with different anisotropy directions $\theta_i$, wherein information is encoded in the distribution of zones with the different anisotropy directions, evaluation of the fractions $f_i(\theta_i)$ from the measured spatial light distribution, wherein $f_i(\theta_i)$ is the fraction of the areas of zones with the anisotropy direction along $\theta_i$ with regard to the total area with anisotropic surface relief microstructure in that region.

Preferably, the dimension of the smallest zones of the pattern is much smaller than the size of the measurement spot. Any position is then macroscopically equivalent, which makes the element convenient for machine-readable verification.

Elements according to the invention allow to design a precise scattering pattern where the lobes appear at a certain azimuthal angle, with a certain relative scattering intensity. Such scattering pattern can be used to verify the authenticity of the element onto which it is attached. The analysed signal can be the total 3D scattering pattern or a 2D cut.

The intensity of the light scattered into the different directions is proportional to the fraction of the zones with the corresponding orientation direction. Accordingly, the information encoded in the orientation distribution results in a characteristic distribution of the scattered light. From the analysis of the distribution of the scattered light, the orientation distribution in the element according to the invention and therefore the encoded information can be evaluated.

There are different methods to evaluate the spatial pattern of the scattered light. A preferred method is by means of conoscopy imaging. Conoscope measurement systems are commercially available and provide sophisticated evaluation algorithms. This allows fast and accurate measurement. Alternatively, a simple evaluation setup is the use of fisheye lens conoscopy which uses a CCD camera coupled to a fisheye lens, as described by A. Alshomrany and N. A. Clark in Liquid Crystals, Vol. 42, No. 3, 271-287 (2015).

Preferably, method for evaluating the information encoded in the orientation distribution comprises measurement of the spatial light distribution using a conoscopy imaging system.

According to a third aspect of the invention there is provided a method for the manufacturing of an element according to the first aspect of the invention. The method for manufacturing of the optical element comprises using an encoding algorithm to generate a pattern of an orientation distribution, which represents the information to be encoded. The method further comprises the manufacturing of a patterned anisotropic surface relief microstructure, which has zones with different anisotropy directions $\theta_i$, according to the pattern that has been calculated in order to encode the information.

Methods for the production of patterned anisotropic surface relief microstructures are well known to a skilled person. In particular, the methods may be used which are disclosed in the above cited documents WO2007/131375 U.S. Pat. No. 7,710,652B2 or in WO-A-01/29148.

BRIEF DESCRIPTION OF THE DRAWINGS

FIG. 1.1 is an illustration of light reflection at an isotropically structured surface.

FIG. 1.2 is similar to FIG. 1.1, but illustrates the characteristic output light distribution from a reflection at an anisotropically scattering surface.

FIG. 2 illustrates pixels with differing anisotropy direction orientation.

DETAILED DESCRIPTION OF THE INVENTION

Figure 3:
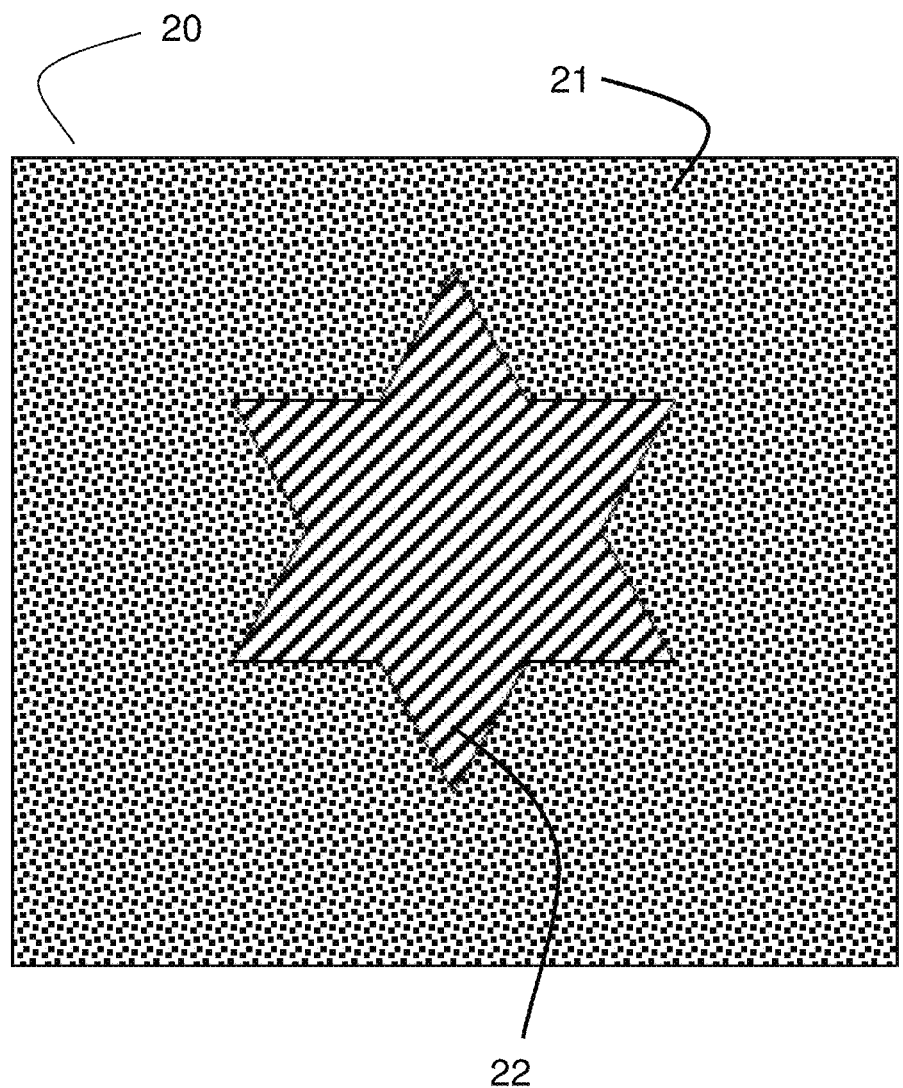
FIG. 3 shows an optical element according to the invention which combines a first level and a third level security feature.

Preferably, an average diagonal of the smallest zones of a pattern are smaller than 1 mm, more preferred smaller than 0.3 mm and most preferred smaller than 0.1 mm.

Preferably the zones with different orientation of the anisotropy axis are randomly distributed.

The minimum size of an area of a region with a defined ratio of the zones oriented in the different directions depends on the optical detection system. Preferably, an average diagonal or diameter of a region is larger than 0.5 mm, more preferred larger than 1 mm and most preferred larger than 2 mm.

The number of different directions in a pattern of an element according to the invention is 2 or higher. In principle an element may have any number of directions. However, the measurement system and the evaluation algorithm may have limitations in resolution. Therefore, it may be reasonable to use less than 10 different orientation directions. Most preferred are pattern with 3, 4 and 5 different orientation directions.

The number of different information that can be encoded in a pattern depends on the number of different directions and the number of intensity levels that can be distinguished by the measurement and evaluation system. As an example, if a pattern has 3 different directions and the evaluation system allows to distinguish 20 different intensity levels associated with each of the directions than 8000 different information can be encoded in a single pattern.

Preferably, the anisotropic surface relief microstructure in the pattern encoding information by the orientation distribution is non-periodic.

Preferably, there are areas wherein the average structure depth of the non-periodic, anisotropic surface relief microstructure is larger than 60 nm, more preferably, the average structure depth of the microstructure is larger than 90 nm. For the generation of colors, the average structure depth of the microstructure is preferably larger than 180 nm, more preferred larger than 300 nm and most preferred larger than 400 nm. Preferred ranges of the average structure depth for providing distinctive colors are 180 nm to 230 nm, 240 nm to 280 nm, 290 nm to 345 nm, 365 nm to 380 nm and 430 nm to 600 nm.

Contrary to a periodic structure, which repeats itself after a certain interval, and which is therefore predictable once the structure of a period is known, as the surface profile of a non-periodic structure cannot be predicted at a distance from a known part of the structure. For determination of a surface profile being non-periodic the autocorrelation function and a related autocorrelation length can be used. The autocorrelation function of a surface profile can be understood as a measure for the predictability of the surface profile for two spatially separated points by a distance x in the plane.

The autocorrelation function AC(x) of a function P(x), such as the surface relief microstructure profile, is defined as $$AC(x) = \int P(x') \cdot P(x'+x) \cdot dx'$$

For a non-periodic or non-deterministic surface profile, the autocorrelation function decays rapidly with increasing x. On the other hand, for a deterministic surface profile found for instance in a grating, the autocorrelation function is modulated with a periodic function but the amplitude does not decay.

With the help of the autocorrelation function, a single characteristic number, an autocorrelation length L, can be defined. It is the length for which the envelope of the autocorrelation function decays to a certain threshold value. For the present purpose, a threshold value of 10% of AC(x=0) proved to be suitable.

In the context of the present invention it is preferred that a non-periodic, anisotropic surface relief microstructure has at least in one direction an averaged one-dimensional autocorrelation function AC(x) that has an envelope, which decays to 10% of the AC at x=0 within an autocorrelation length, wherein the autocorrelation length is smaller than three times an average lateral distance between adjacent transitions of top and bottom regions, such as hills and valleys. Preferably, the one direction is perpendicular to the anisotropy direction. Preferably, the anisotropic surface relief microstructure is also modulated along the anisotropy direction y, such that the envelope of an averaged autocorrelation function AC(y) decays to 10% of the AC at y=0 within an autocorrelation length, wherein the autocorrelation length is smaller than three times an average lateral distance between adjacent transitions of top and bottom regions along the anisotropy direction.

More preferred are surface relief microstructures, wherein the autocorrelation length is smaller than two times an average lateral distance between adjacent transitions of top and bottom regions. Even more preferred are surface relief microstructures, wherein the autocorrelation length is smaller than one average lateral distance between adjacent transitions of top and bottom regions.

Preferably, the autocorrelation length (L) is greater than one hundredth average lateral distance between adjacent transitions of top and bottom regions.

There are different known methods, which can be used to generate non-periodic, anisotropic surface relief microstructures, such as self-organization in copolymer or dewetting, laser ablation, electron- or ion beam lithography and nanoimprint lithography. The microstructures can, for example, simply be replicated by embossing using an embossing tool containing the microstructure.

A preferred method of manufacturing non-periodic, anisotropic surface relief microstructures is described in the international patent application WO-01/29148, the content of which is incorporated herein by reference. The method makes use of the so called monomer corrugation (MC) technology. It relies on the fact that phase separation of special mixtures or blends applied to a substrate is induced by crosslinking, for instance by exposure to ultraviolet radiation. The subsequent removal of non-crosslinked components leaves a structure with a specific surface topography. The term MC-layer is used for layers prepared according to this technology. Anisotropy of the microstructure can, for example, be achieved if liquid crystalline mixtures are used, which are aligned by an underlying alignment layer. By using an alignment layer with an orientation pattern, it is possible to create a patterned, non-periodic, anisotropic surface relief microstructures.

In preferred embodiments an element according to the invention generates colors when illuminated with white light. Manufacturing of suitable surface relief microstructures is disclosed in WO2007/131375, the content of which is incorporated herein by reference.

Preferably, the method of manufacturing a non-periodic, anisotropic surface relief microstructures according to the invention comprises the steps of coating a thin photo-alignment film on a substrate, generation of an orientation pattern by exposing individual areas of the photo-alignment film to linearly polarized UV light of different polarization directions, coating a blend of crosslinkable and non-crosslinkable liquid crystal materials on top of the photo-alignment film, cross-linking the liquid crystalline blend and removing the non-cross-linked material, for example using an adequate solvent.

Cross-linking of the liquid crystalline blend is preferable done by exposure to actinic light. The cross-linking process induces a phase separation and cross-linking of the liquid crystal prepolymer. The basic principles and the optical behavior of micro-corrugated thin-films are for example disclosed in the international patent application WO01/29148.

Preferably, optical elements according to the invention are at least partially reflective. The optical elements according to the invention therefore preferably comprise reflective or partially reflective layers using materials such as gold, silver, copper, aluminum, chromium or pigments. The reflective or partially reflective layers may further be structured such that they cover only part of the optical element. This can be achieved, for example, by structured deposition of the layer or by local de-metallization.

Reflection can also be caused by a transition to a material having a different index of refraction. Therefore, in a preferred embodiment of the invention the surface of the microstructure of an optical element according to the invention is at least partially covered with a dielectric material.

Examples of high index refraction materials are ZnS, ZnSe, ITO or TiO2. Composite materials including nanoparticles of high index refraction materials could also be suitable. The cover medium may also be absorptive for certain colors to change the color appearance of the device.

Optionally, the surface relief microstructures of an optical element according to the invention may be sealed in order to protect the element against mechanical impact, contamination and in order to prevent unauthorized and illegal making of replicas of such elements. Therefore, optical elements according to the invention preferably comprise a sealing layer on top of the microstructure.

Optical elements produced according to the present invention can be used in different applications which deal with spatial modulation of the light intensity. Preferably the optical elements according to the invention are used as security elements in security devices. Specifically such security devices are applied to or are incorporated into documents, passports, licenses, stocks and bonds, coupons, cheques, certificates, credit cards, banknotes, tickets etc. against counterfeiting and falsification. The security devices further can also be applied as or incorporated into brand or product protection devices, or into means for packaging, like wrapping paper, packaging boxes, envelopes etc. Advantageously, the security device may take the form of a tag, security strip, label, fiber, thread, laminate or patch etc.

EXAMPLES

Sample Preparation

For the examples below the samples are made by first preparing a photo-alignment layer on a silicon wafer by spin-coating. An orientation pattern is created in the photo-alignment layer by sequential exposure of the different zones to linearly polarized uv-light of the desired polarization directions, which is provided by a laser scanning exposure system. The laser scanning system is controlled by a computer which provides the pattern information of the zones of different orientation direction. This avoids the use of multiple photo-masks and therefore allows fast generation of arbitrary orientation patterns. The pattern comprising randomly distributed zones corresponding to the different orientation directions with a desired area fraction is generated by a computer algorithm.

A patterned anisotropic surface relief microstructure is then manufactured using the MC-technology procedure disclosed in WO01/29148, which is incorporated herein by reference.

Figure 4:
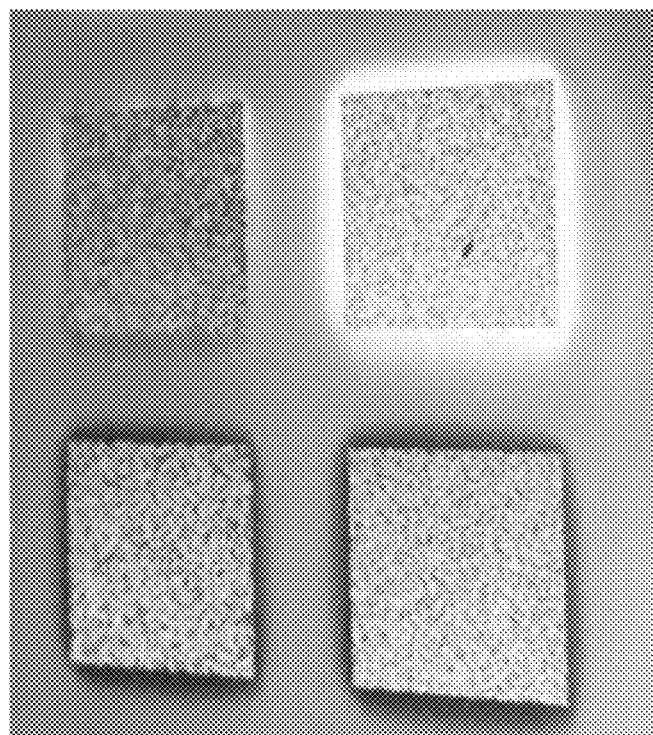
FIG. 4 shows patterned anisotropic surface relief microstructures according to the invention manufactured on a silicon wafer.

FIG. 4 shows a photograph of a silicon wafer with four different regions, each of them comprising a patterned anisotropic surface relief microstructure with information encoded in the pattern according to the invention.

The scattering characteristics of the samples of the examples below are measured by conoscopy using an ELDIM EZContrast 160R measurement system. The samples are illuminated with collimated white light from a normal incidence angle with regard to the surface plane of the sample and the luminosity of the reflected light is measured as a function of the azimuthal (0°-360°) and zenithal (0°-80°) angle.

Figure 5:
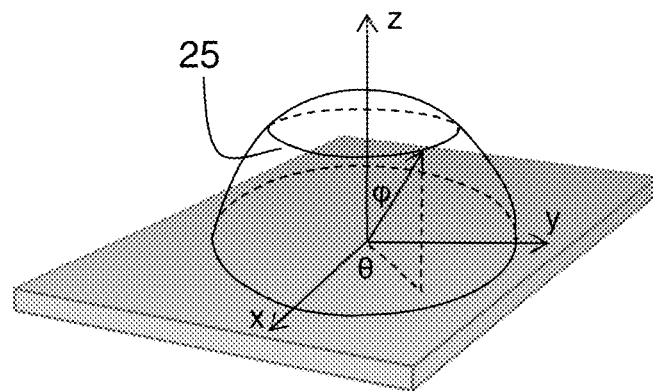
FIG. 5 illustrates the geometry used for the angular dependent measurement of the scattered light intensity.

FIG. 5 illustrates the measurement geometry, wherein the azimuthal angle is referred to as θ and the polar angle is referred to as φ.

The evaluation can either take into account the full distribution of the scattered light or it may use only part of the spatial light distribution if this part is characteristic and provides sufficient data to evaluate the encoded information.

The evaluation of the samples of the examples below has been made by only taking into account the data measured for a constant polar angle φ of 30° as indicated in FIG. 5 by the numeral 25.

Example 1

Figure 6:
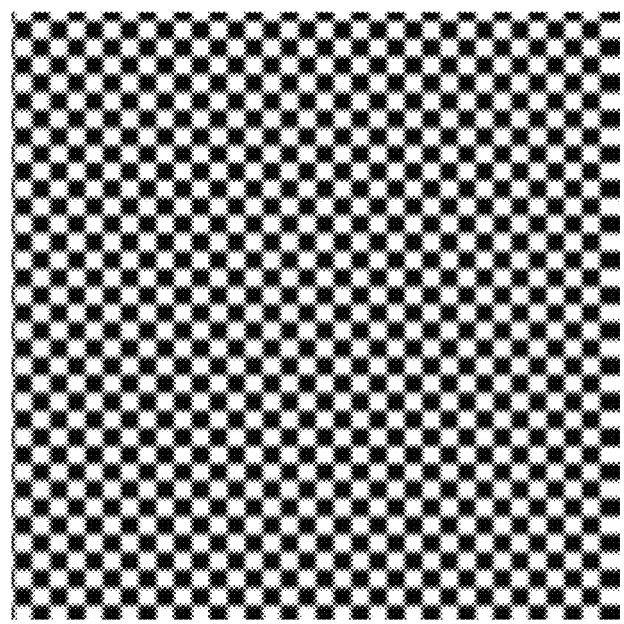
FIG. 6a shows the form of the pattern used in example 1.
FIG. 6b shows the related conoscopic measurement.
Figure 6:
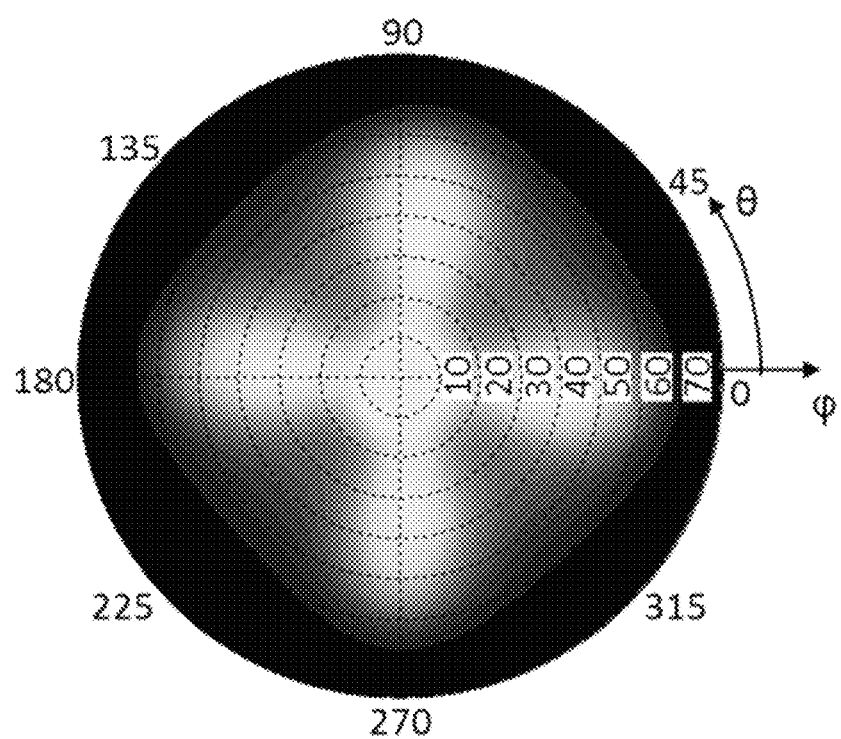

An optical element according to the invention is made as described above. The element comprises a patterned anisotropic surface relief microstructure with two types of regularly distributed zones, which differ in the anisotropy direction. The different zones are arranged in checkerboard pattern, wherein the zones corresponding to the different directions are represented as black and white, respectively, as shown in FIG. 6a. Each of the zones is 50 µm×50 µm. The orientation direction in the first type of zone is oriented at 0° with regard to a reference direction and the first zones have a fraction $f_1=50\%$. The orientation direction in the second type of zone is oriented at 90° with regard to a reference direction and the zones have a fraction $f_2=50\%$.

FIG. 6b shows the result of the conoscopic measurement. For determination the fraction of the different zones a curve is created using only the data for the polar angle 30°, as described above. For the fitting algorithm it is assumed that the scattering profiles related to the different types of zones have a Gaussian distribution. The result from the evaluation of the sample is that the fraction $f_1$ of zones 1 is 48.5% and fraction $f_2$ of zones 2 is 51.5%. The result is very close to the fraction that has been defined by the distribution pattern. Hence the information encoded in the pattern is decoded.

Example 2

Figure 7:
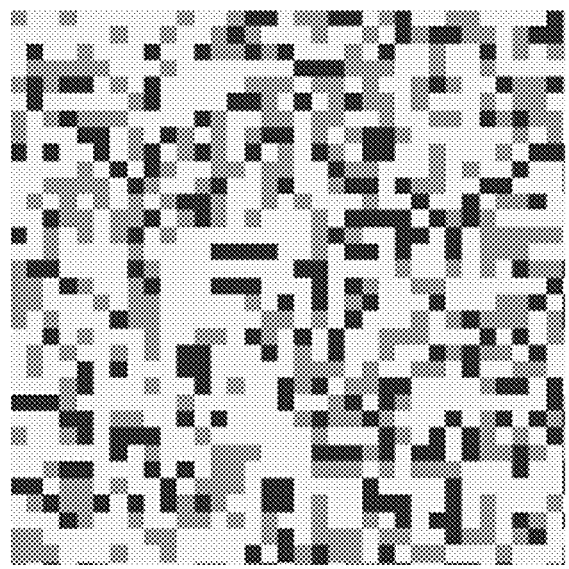
FIG. 7a shows the form of the pattern used in example 2.
FIG. 7b shows the related conoscopic measurement.
Figure 7:
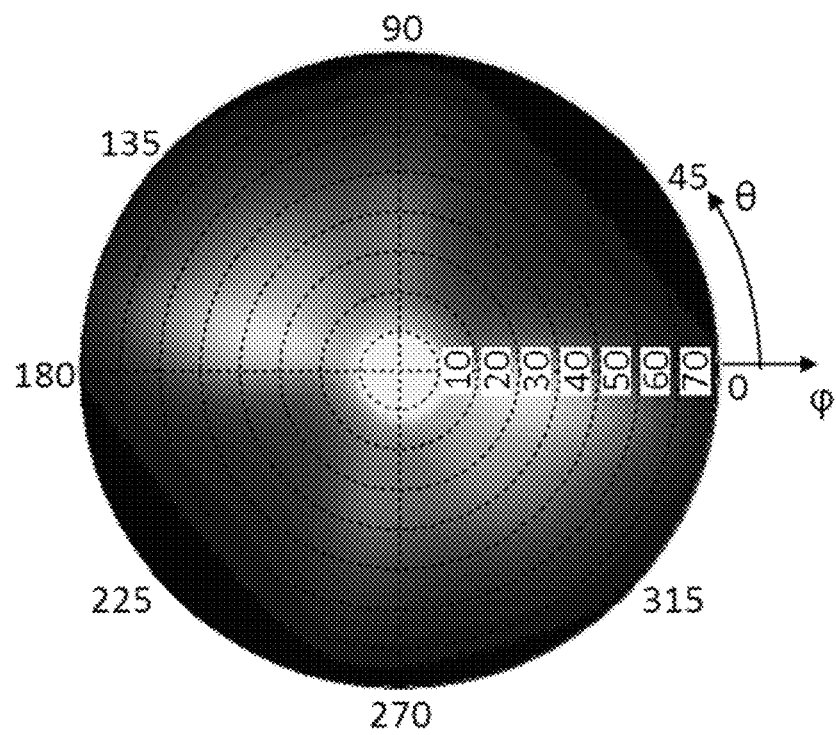

An optical element according to the invention is made as described above. The element comprises a patterned anisotropic surface relief microstructure with three types of randomly distributed zones, which differ in the anisotropy direction. FIG. 7a shows the pattern that has been created, wherein the zones corresponding to the different directions are represented in three different grey levels. The size of the smallest zone (unit zone) is 50 µm×50 µm, but because of the random arrangement larger zones are formed as well. The unit zone has the form of a square. The orientation direction in the first type of zone is oriented at 0° with regard to a reference direction and the first zones have a fraction $f_1=50\%$. The orientation direction in the second type of zone is oriented at 45° with regard to a reference direction and the zones have a fraction $f_2=30\%$. The orientation direction in the third type of zone is oriented at 90° with regard to a reference direction and the zones have a fraction $f_3=20\%$.

FIG. 7b shows the result of the conoscopic measurement. The evaluation is made as described in example 1. The result from the evaluation of the sample is that the fraction $f_1$ of zones 1 is 52.5%, fraction $f_2$ of zones 2 is 33.4% and fraction $f_3$ of zones 3 is 14.1%. The result is very close to the fraction that has been defined by the distribution pattern. Hence the information encoded in the pattern is decoded.

Example 3

Figure 8:
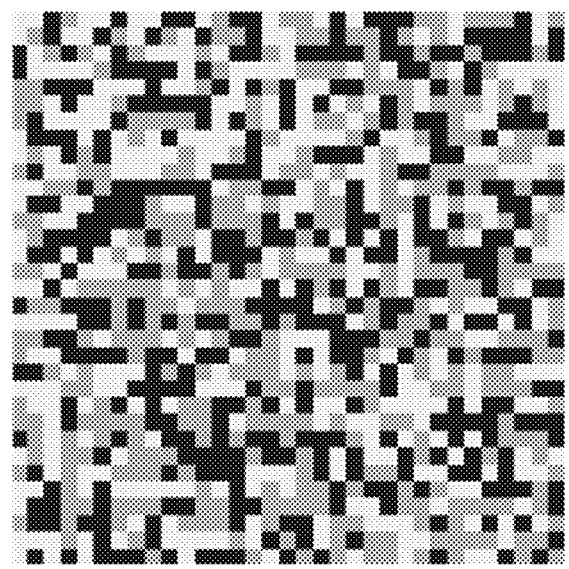
FIG. 8a shows the form of the pattern used in example 3.
FIG. 8b shows the related conoscopic measurement.
Figure 8:
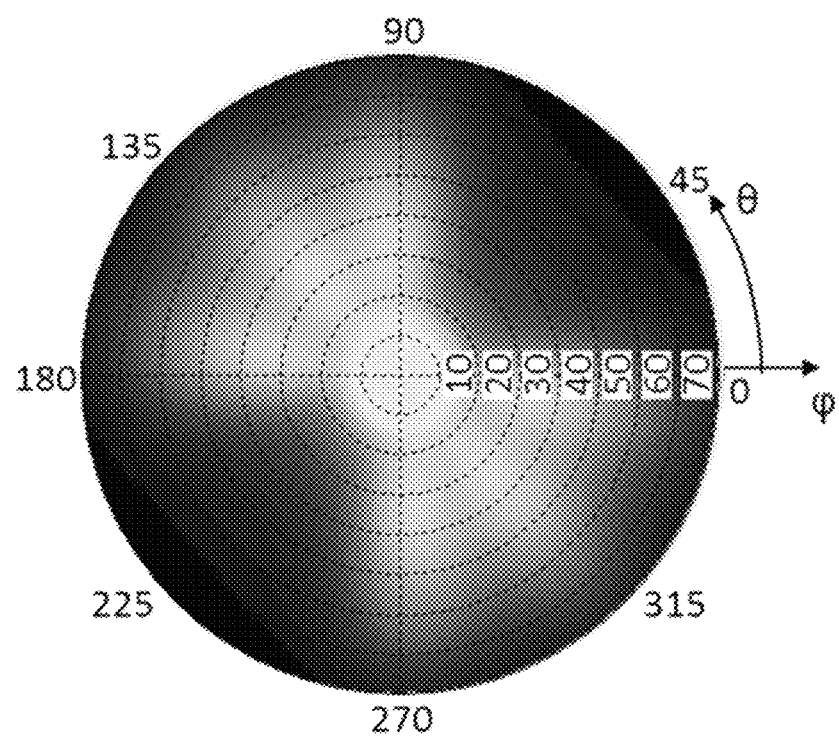

An optical element according to the invention is made as described above. The element comprises a patterned anisotropic surface relief microstructure with three types of randomly distributed zones, which differ in the anisotropy direction. FIG. 8a shows the pattern that has been created, wherein the zones corresponding to the different directions are represented in three different grey levels. The size of the smallest zone (unit zone) is 50 µm×50 µm, but because of the random arrangement larger zones are formed as well. The unit zone has the form of a square. The orientation direction in the first type of zone is oriented at 0° with regard to a reference direction and the first zones have a fraction $f_1=33.3\%$. The orientation direction in the second type of zone is oriented at 45° with regard to a reference direction and the zones have a fraction $f_2=33.3\%$. The orientation direction in the third type of zone is oriented at 90° with regard to a reference direction and the zones have a fraction $f_3=33.3\%$.

FIG. 8b shows the result of the conoscopic measurement. The evaluation is made as described in example 1. The result from the evaluation of the sample is that the fraction $f_1$ of zones 1 is 34.1%, fraction $f_2$ of zones 2 is 35.0% and fraction $f_3$ of zones 3 is 30.9%. The result is very close to the fraction that has been defined by the distribution pattern. Hence the information encoded in the pattern is decoded.

Example 4

Figure 9:
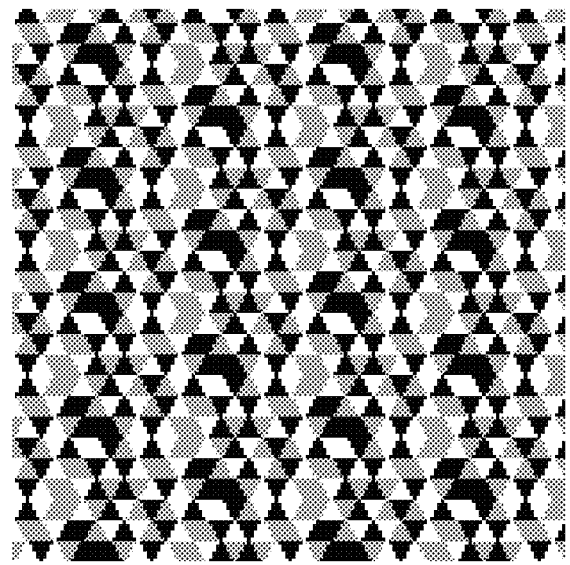
FIG. 9a shows the form of the pattern used in example 4.
FIG. 9b shows the related conoscopic measurement.
Figure 9:
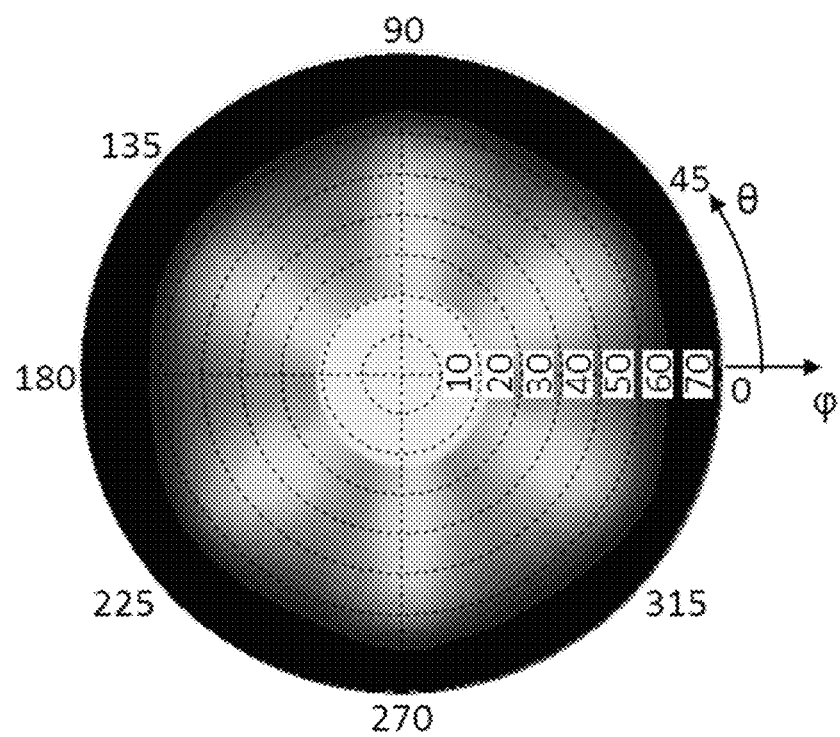

An optical element according to the invention is made as described above. The element comprises a patterned anisotropic surface relief microstructure with three types of randomly distributed zones, which differ in the anisotropy direction. FIG. 9a shows the pattern that has been created, wherein the zones corresponding to the different directions are represented in three different grey levels. The unit zone has the form of a triangle. The orientation direction in the first type of zone is oriented at 0° with regard to a reference direction and the first zones have a fraction $f_1=33.3\%$. The orientation direction in the second type of zone is oriented at 60° with regard to a reference direction and the zones have a fraction $f_2=33.3\%$. The orientation direction in the third type of zone is oriented at 120° with regard to a reference direction and the zones have a fraction $f_3=33.3\%$.

FIG. 9b shows the result of the conoscopic measurement. The evaluation is made as described in example 1. The result from the evaluation of the sample is that the fraction $f_1$ of zones 1 is 33.2%, fraction $f_2$ of zones 2 is 33.1% and fraction $f_3$ of zones 3 is 33.7%. The result is very close to the fraction that has been defined by the distribution pattern. Hence the information encoded in the pattern is decoded.

The invention claimed is:

1. A method for manufacturing an optical element comprising a region with an anisotropic surface relief microstructure, which has zones with different anisotropy directions $\theta i$, wherein information is encoded in a frequency distribution of the zones with the different anisotropy directions, the method comprising
    providing the information to be encoded;
    defining the number of different anisotropy directions $\theta i$ to be used for encoding;
    defining a frequency distribution $fi(\theta i)$ of zones with different anisotropy directions, the frequency distribution $fi(\theta i)$ representing the information to be encoded;
    determining a positional orientation distribution of zones with different anisotropy directions $\theta i$, the positional orientation distribution fitting with the determined frequency distribution, and
    manufacturing the optical element comprising the region with the anisotropic surface relief microstructure, which has zones with different anisotropy directions $\theta i$, according to the determined positional orientation distribution,
    wherein the manufacturing the optical element comprises manufacturing the anisotropic surface relief microstructure, and
    wherein the manufacturing the anisotropic surface relief microstructure comprises:
    coating a thin photo-alignment film on a substrate,
    exposing the photo-alignment film to linearly polarized ultraviolet (UV) light of different polarization directions according to the determined positional orientation distribution,
    coating a blend of crosslinkable and non-crosslinkable liquid crystal materials on top of the photo-alignment film,
    cross-linking the liquid crystalline blend, and
    removing the non-cross-linked liquid crystal material.

2. The method of claim 1, wherein an average diagonal or diameter of the region is larger than 0.5 mm.

3. The method of claim 1, wherein an average diagonal or diameter of the region is larger than 2 mm.

4. The method of claim 1, wherein the number of different anisotropy directions is 3, 4 or 5.

5. The method of claim 1, wherein the anisotropic surface relief microstructure is non-periodic.

6. The method of claim 5, wherein an average structure depth of the non-periodic, anisotropic surface relief microstructure is larger than 60 nm.

7. The method of claim 5, wherein an average structure depth of the non-periodic, anisotropic surface relief microstructure is larger than 180 nm.

* * * * *